Oct. 3, 1933.  W. E. SWENSON  1,929,265
INTERNAL COMBUSTION ENGINE
Filed Feb. 16, 1931   2 Sheets-Sheet 1

INVENTOR
WILLIAM E. SWENSON
By Paul, Paul & Moore
ATTORNEYS

Oct. 3, 1933.  W. E. SWENSON  1,929,265
INTERNAL COMBUSTION ENGINE
Filed Feb. 16, 1931  2 Sheets-Sheet 2
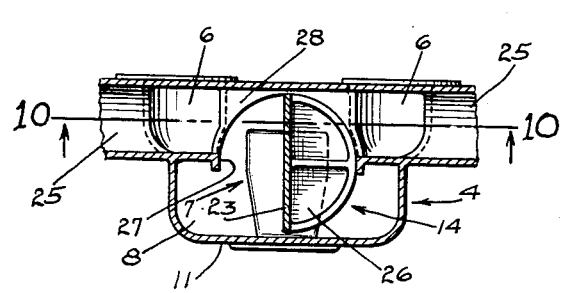
Fig. 7
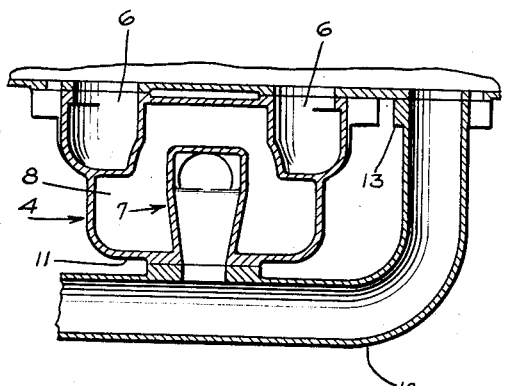
Fig. 8
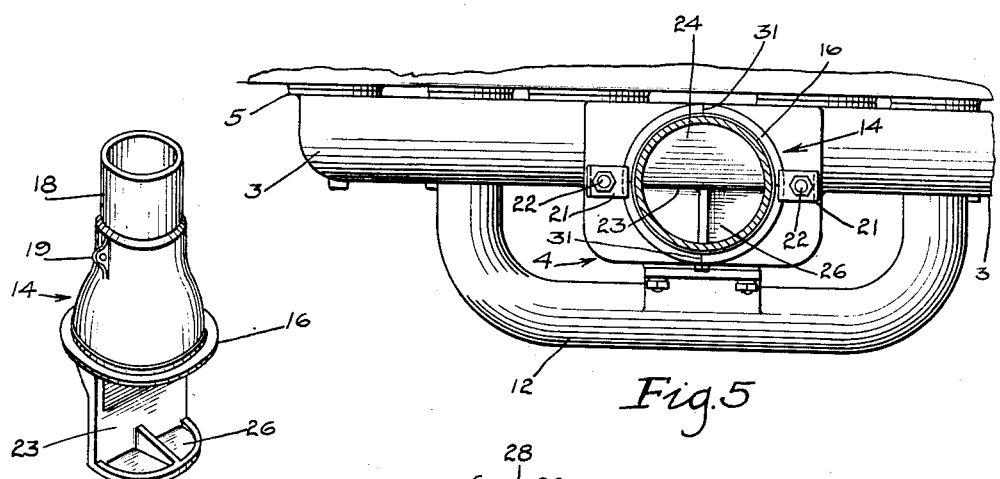
Fig. 6
Fig. 5
Fig. 9
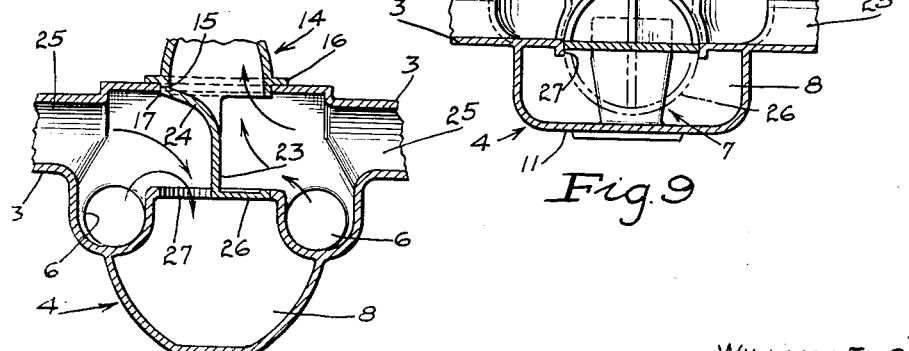
Fig. 10
INVENTOR
WILLIAM E. SWENSON
ATTORNEYS

Patented Oct. 3, 1933

1,929,265

UNITED STATES PATENT OFFICE 1,929,265

INTERNAL COMBUSTION ENGINE

William E. Swenson, St. Paul, Minn., assignor to Minneapolis-Moline Power Implement Company, Hopkins, Minn., a corporation of Delaware Application February 16, 1931. Serial No. 515,964

5 Claims. (Cl. 123—122)

This invention relates to new and useful improvements in internal combustion engines, and more particularly to a means whereby the preheating of the raw fuel mixture delivered to the engine may be controlled.

An object of the invention is to provide in combination with an internal combustion engine having a heating chamber communicating with the exhaust ports thereof and through which the fuel mixture is conducted for the purpose of preheating it before it is delivered to the compression chambers of the engine, a device for controlling the circulation of the exhaust gases through said chamber whereby the preheating of the fuel mixture may be controlled.

A further object is to provide an exhaust manifold for an internal combustion engine provided with a casing, the walls of which define a heating chamber through which the exhaust gases from the engine may pass, and a conduit being provided within said chamber adapted to conduct the fuel mixture through the chamber for the purpose of preheating it, and a damper being mounted on said casing, and adapted to control the circulation of the exhaust gases through said chamber, whereby the heating of the fuel mixture may be controlled.

A further object is to provide an exhaust manifold provided with a casing, the walls of which define a heating chamber through which the exhaust gases from the engine may pass, and an L-shaped conduit being disposed within said chamber and having one end adapted for connection with a carburetor and its opposite end with the intake manifold of the engine, and the walls of said conduit being spaced from the walls of said casing to permit circulation of the exhaust gases therearound, whereby the walls thereof may be heated to cause the fuel mixture passing through the conduit to be preheated and atomized, and a damper being mounted for rotary movement on the upper wall of said casing and having a portion depending into said heating chamber and cooperating with means therein for diverting all or a portion of the exhaust gases through said heating chamber, whereby the preheating of the fuel mixture may be controlled.

The primary object of the invention therefore, is to provide in combination with an internal combustion engine, a device whereby the preheating of the fuel mixture before it is delivered to the compression chambers of the engine may be controlled and, whereby low grade fuel oils, such as kerosene and distillates, may be economically and efficiently used as an engine fuel, and also whereby the preheating of the fuel mixture may be regulated in accordance with atmospheric temperatures.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 5 is a sectional plan view on the line 5—5 of Figure 1;

Figure 6 is a perspective view showing the damper removed from the casing;

Figure 7 is a detail sectional plan view on the line 7—7 of Figure 3, showing the damper positioned to divert only a portion of the exhaust gases through the heating chamber;

Figure 8 is a detail plan view on the line 8—8 of Figure 3;

Figure 9 is a detail sectional view similar to Figure 7, but showing the damper positioned as shown in Figure 3; and Figure 10 is a detail sectional view on the line 10—10 of Figure 7, showing the paths traveled by the exhaust gases when the damper is positioned as shown in Figure 7.

Figure 1:
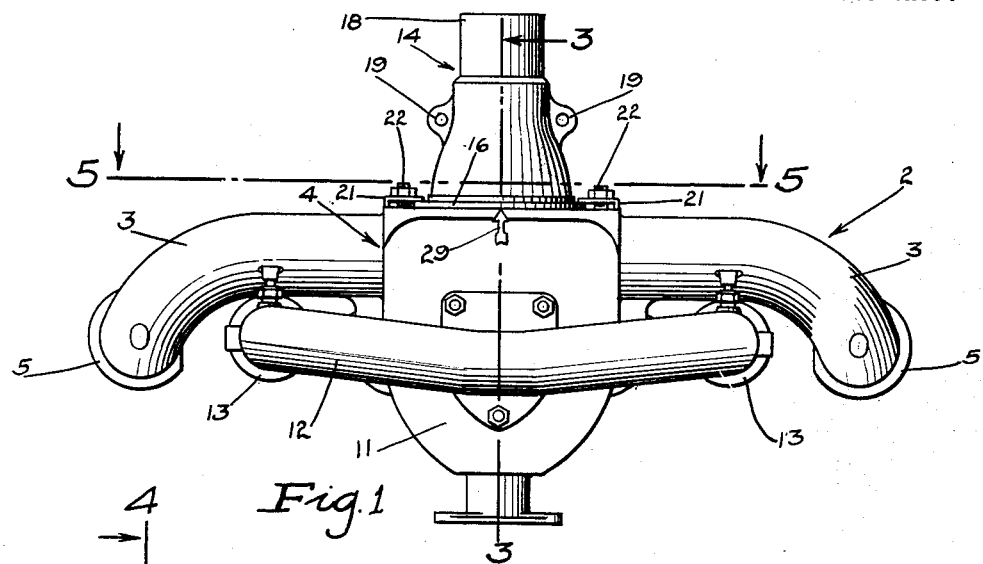
Figure 1 is a side elevation illustrating the invention embodied in the construction of the exhaust manifold.
Figures 2, 3, 4:
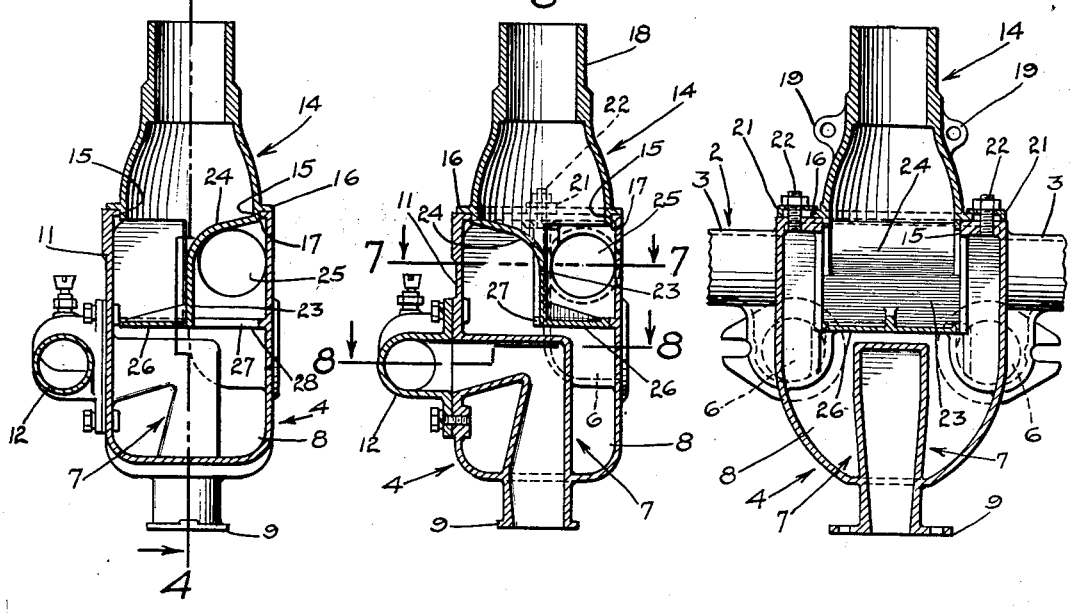
Figure 2 is a vertical sectional view showing the damper positioned to cause substantially all of the exhaust gases to circulate through the heating chamber.
Figure 3 is a vertical sectional view on the line 3—3 of Figure 1 showing the damper positioned to cause all of the exhaust gases to be discharged directly to the atmosphere without passing through the heating chamber.
Figure 4 is a vertical sectional view on the line 4—4 of Figure 2.

In the selected embodiment of the invention here shown, there is illustrated in Figures 1 and 2, an exhaust manifold 2 comprising oppositely extending arms 3—3, having a casing 4 provided intermediately thereof, and here shown as being integrally formed therewith. The arms 3—3 are provided with flanged openings 5—5 adapted to be connected to the exhaust ports of the two end cylinders of the engine. Suitable openings 6—6 are provided in the intermediate portion of the manifold whereby the latter may be connected to the exhaust ports of the two intermediate cylinders. The exhaust manifold here shown is adapted for a four cylinder engine.

Means are provided within the casing 4 for preheating the fuel mixture before reaching the compression chambers of the engine. Such means is here shown as consisting of a conduit 7 disposed within the heating chamber 8, defined by the walls of the casing 4, and having its lower end portion extending through the bottom wall of the casing and provided with a terminal flange 9 whereby a carburetor may be attached thereto. The conduit is preferably right-angular in configuration and the upper horizontal portion thereof is connected with the front wall 11 of the casing, and is provided with means whereby an intake manifold 12 may be connected therewith. The intake manifold is here shown as being U-shaped as best illustrated in Figure 8. Suitable means 13 are provided at the ends of the intake manifold whereby it may be secured to the cylinder block of the engine for connection with the intake ports thereof.

The heating chamber 8 is adapted to be connected with the exhaust manifold so that the exhaust gases being expelled from the engine cylinders may circulate through the heating chamber and thereby heat the walls of the conduit 7, so that the fuel mixture passing therethrough will be preheated and thoroughly atomized before being delivered to the engine cylinders.

An important feature of this invention resides in the means provided for controlling the circulation of the exhaust gases through the heating chamber whereby the preheating of the fuel mixture may be controlled. To thus control the circulation of the exhaust gases, a suitable damper 14 is mounted in an opening 15 provided in the upper wall of the casing 4. This damper is preferably shaped as shown in Figure 6 and has an annular flange 16 adapted to be seated against the upper wall of the casing, as best shown in Figures 2, 3, and 4. The damper is provided with a cylindrical portion 17 which fits into the bore 15. The upper end portion 18 of the damper is here shown as being cylindrical in cross section and is adapted to have the usual exhaust pipe (not shown) connected therewith. Apertured lugs 19 are provided upon the body of the damper whereby the latter may be conveniently rotated to control the flow of exhaust gases through the heating chamber. The damper may be secured in adjusted position by means of clamping members 21 and studs 22, best shown in Figure 4.

The damper is provided with a depending wall portion 23, the upper portion 24 of which is curved or rounded as shown in Figures 2 and 3 so as to clear the outlet openings 25—25 of the arms 3—3 of the exhaust manifold, when the damper is positioned as shown in Figure 2. The openings 6—6 of the exhaust manifold also communicate with the outlet openings 25—25, as will be understood by reference to Figures 7, 9, and 10.

A horizontally disposed wall portion 26 is provided at the lower end of the upright wall 23 of the damper. The periphery of the wall portion 26 is adapted to engage a semi-cylindrical seat 27 provided in a web 28, horizontally disposed within the heating chamber 8 beneath the outlet openings 25—25.

When the damper is positioned as shown in Figures 3 and 9, with the periphery of the horizontal wall portion 26 engaged with the semi-cylindrical seat 27, all of the exhaust gases from the engine will be discharged directly to the atmosphere and will not pass through the heating chamber 8. When the damper is positioned as shown in Figure 2, all of the exhaust gases will be diverted through the heating chamber, thereby causing the walls of the conduit 7 to become heated, whereby the fuel passing through the conduit will be preheated before being delivered to the engine cylinders.

Figures 7 and 10 show the damper positioned to cause only a portion of the exhaust gases to circulate through the heating chamber 8. When thus positioned, the exhaust gases from the two of the cylinders will circulate through the heating chamber, as indicated by the arrows in Figure 10, while the exhaust gases expelled from the other two cylinders will be directed upwardly through the damper, as indicated by the arrows at the right hand side of Figure 10.

Suitable means are provided for indicating the position of the damper and may consist of an arrow 29, provided on the front wall of the casing 4, as shown in Figure 1. Suitable indicia or marks may be provided upon the upper surface of the flange 16, as indicated at 31 in Figure 5, whereby the operator may note the position of the damper. The damper is readily adjusted by simply loosening the nuts provided upon the studs 22, and inserting an instrument in one of the apertured lugs 19, whereby the damper may readily be rotated relative to the casing 4.

In order to burn kerosene and distillates as well as gasoline, in an internal combustion engine, it is usually necessary to provide means for preheating the fuel mixture before the latter reaches the combustion chambers of the engine, in order to reduce the fuel to a combustible state. When gasoline or other high grade fuels are to be used as a fuel, it may be desirable not to preheat the fuel mixture, or, to only partially preheat it. By the employment of the novel damper featured in this invention, the preheating of the fuel mixture may be accurately controlled so as to cause the engine to operate at high efficiency at all times.

The damper has proven to be a valuable adjunct to an engine which is to be operated in climates which greatly vary in temperature. For example, when the engine is operating in hot torrid climates, it may be desirable not to preheat the fuel mixture, even though low grade fuels such as kerosene and distillates be used. When the engine is operated in such a climate, the damper may be positioned as shown in Figures 3 and 9, whereby all of the exhaust gases will be directed upwardly through the damper 14 and will not pass through the lower portion of the heating chamber. On the other hand, when the engine is to be operated in relatively lower atmospheric temperatures, it may be necessary that the fuel mixture be preheated before it is delivered to the combustion chambers in order to reduce it to a combustible state. This is particularly so when low grade fuel such as kerosene and distillates are used. To thus preheat the fuel mixture, the valve may be positioned as shown in Figures 7 and 10, whereby a portion of the fuel gases will heat the chamber and thereby heat the walls of the conduit 7. If it is found that the fuel mixture does not become sufficiently heated when the valve is positioned as shown in Figures 7 and 10, it may be advanced to the position shown in Figures 2, 4, and 5, whereby the damper will divert all of the fuel gases downwardly through the lower portion of the heating chamber 8 into direct contact with the walls of the conduit 7, whereby the latter may be heated to a high temperature, resulting in thorough atomization of the fuel mixture as it passes through the conduit 7.

By the employment of the novel exhaust manifold herein disclosed, it will be noted that when the damper 14 is positioned as shown in Figures 3 and 9, the exhaust gases will be discharged directly to the atmosphere through the damper 14, and will not pass through the heating chamber 8, whereby the fuel mixture passing through the conduit 7 will not be materially affected by the heat of the exhaust gases. Also due to the fact that the intake manifold 12 is attached to the casing 4 at a point remote from the path traveled by the exhaust gases when being discharged directly to the atmosphere, as above described, and also because of the relatively small metallic connection between the intake manifold and the casing 4, radiation and conduction of the heat from the exhaust manifold to the intake manifold is reduced to a minimum. The advantage of this construction is that when the engine is operated in torrid climates, the temperature of the air fuel mixture may be maintained at a minimum, and thereby assure efficient engine performance. Conversely, when the engine is operated in a colder climate, the damper 14 may be positioned so as to cause the exhaust gases to preheat the air fuel mixture before being delivered to the intake manifold. It will thus be seen that by the utilization of this novel exhaust manifold, including the damper 14 and heating chamber 8, an internal combustion engine may be efficiently and economically operated in varying climates, even though a low grade fuel is used.

In the drawings, I have shown the invention embodied in the construction of an exhaust manifold adapted for a four cylinder engine, but it is to be understood that the invention may be used in connection with other types of internal combustion engines with equal results, and without departing from the scope of the invention.

I claim as my invention:

1. In combination with an internal combustion engine including an exhaust manifold provided with a casing, the walls of which define a heating chamber through which the exhaust gases from the engine may pass to the atmosphere, a conduit disposed within said chamber adapted to conduct the fuel mixture therethrough, the walls of said conduit being spaced from the walls of said casing to permit circulation of the exhaust gases therearound whereby the walls of said conduit may be heated, and a damper mounted in the upper wall of said casing and having a portion depending into said heating chamber adapted to cooperate with means therein to control circulation of the exhaust gases through said heating chamber, and said damper being mounted for rotation about a vertical axis.

2. In combination with an internal combustion engine including an exhaust manifold provided with a casing, the walls of which define a heating chamber through which the exhaust gases from the engine may pass to the atmosphere, a conduit disposed within said chamber adapted to conduct the fuel mixture therethrough, the walls of said conduit being spaced from the walls of said casing to permit circulation of the exhaust gases therearound whereby the walls of said conduit may be heated, a damper mounted in the upper wall of said casing and adapted for rotary movement, said damper having a vertically disposed wall portion depending into the chamber, and means at the lower portion of said vertically disposed wall portion adapted to cooperate with means in said chamber to control circulation of the exhaust gases through said heating chamber, whereby the pre-heating of the fuel mixture may be controlled.

3. In combination with an internal combustion engine including an exhaust manifold provided with a casing, the walls of which define a heating chamber through which the exhaust gases from the engine may pass to the atmosphere, a conduit disposed within said chamber adapted to conduct the fuel mixture therethrough, the walls of said conduit being spaced from the walls of said casing to permit circulation of the exhaust gases therearound whereby the walls of said conduit may be heated, a damper mounted in the upper wall of said casing and adapted for rotary movement, said damper having a vertically disposed wall portion depending into the chamber, a horizontally disposed member secured to the lower end of said vertically disposed wall portion and provided with a semi-cylindrical edge portion, a web disposed within said chamber and having a semi-cylindrical seat adapted to be engaged by said semi-cylindrical edge portion to prevent circulation of the exhaust gases through the heating chamber, and means whereby said damper may be rotated to move said semi-cylindrical edge portion relatively to said web whereby all or only a portion of the exhaust gases may be diverted through said heating chamber to cause heating of the walls of said conduit, and whereby the pre-heating of the fuel mixture may be controlled.

4. In combination with an internal combustion engine including an exhaust manifold provided with a casing, the walls of which define a heating chamber through which the exhaust gases from the engine may circulate, a conduit disposed within said chamber adapted to conduct a fuel mixture therethrough, the walls of said conduit being spaced from the walls of the casing to permit circulation of the exhaust gases therearound whereby the walls of said conduit may be heated to pre-heat the fuel mixture, said casing having an opening in one of its walls, a damper removably mounted in said opening and adapted for rotary adjustment therein, means by which an exhaust pipe may be connected directly to said damper, and said damper having an inwardly extending wall portion provided with means at its inner portion engageable with a seat provided in said chamber, and whereby the circulation of exhaust gases through said heating chamber may be controlled by adjustment of said damper.

5. In combination with an internal combustion engine including an exhaust manifold provided with a casing, the walls of which define a heating chamber through which the exhaust gases from the engine may pass to the atmosphere, a conduit disposed within said chamber adapted to conduct a fuel mixture therethrough, the walls of said conduit being spaced from the walls of said casing to permit circulation of the exhaust gases around said conduit whereby the walls thereof may be heated, and a damper mounted in a wall of said casing and having a portion extending into the chamber and cooperating with means therein to control circulation of the exhaust gases through said heating chamber, and means for securing said damper in adjusted position.

WILLIAM E. SWENSON.